US012606381B2

(12) United States Patent
Bogle et al.

(10) Patent No.: US 12,606,381 B2
(45) Date of Patent: Apr. 21, 2026

(54) OBLIQUE-LINK MODULAR CONVEYOR BELT

(71) Applicant: Laitram, L.L.C., Harahan, LA (US)

(72) Inventors: David W. Bogle, Franklinton, LA (US); Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 48 days.

(21) Appl. No.: 18/706,225

(22) PCT Filed: Sep. 9, 2022

(86) PCT No.: PCT/US2022/042988
§ 371 (c)(1),
(2) Date: Apr. 30, 2024

(87) PCT Pub. No.: WO2023/091224
PCT Pub. Date: May 25, 2023

(65) Prior Publication Data
US 2024/0417178 A1     Dec. 19, 2024

Related U.S. Application Data

(60) Provisional application No. 63/309,814, filed on Feb. 14, 2022, provisional application No. 63/281,983, filed on Nov. 22, 2021.

(51) Int. Cl.
B65G 17/06          (2006.01)
B65G 17/08          (2006.01)

(52) U.S. Cl.
CPC ......... B65G 17/064 (2013.01); B65G 17/086 (2013.01); B65G 2207/24 (2013.01)

(58) Field of Classification Search
CPC . B65G 17/064; B65G 17/086; B65G 2207/24
(Continued)

(56) References Cited

U.S. PATENT DOCUMENTS

| | | | | | |
|---|---|---|---|---|---|
| 1,883,528 | A | * | 10/1932 | Buck | B65G 17/067 |
| | | | | | 198/853 |
| 3,785,476 | A | * | 1/1974 | Poerink | B65G 17/08 |
| | | | | | 198/853 |

(Continued)

FOREIGN PATENT DOCUMENTS

| | | |
|---|---|---|
| DE | 1044707 B | 11/1958 |
| DE | 6916589 U | 11/1969 |

(Continued)

OTHER PUBLICATIONS

Extended European Search Report, European Application No. 22896283. 3, dated Sep. 18, 2025, European Patent Office, Munich, Germany.

*Primary Examiner* — Mark A Deuble
(74) *Attorney, Agent, or Firm* — James T. Cronvich

(57) ABSTRACT

Conveyor belt modules and a modular conveyor belt constructed of those modules. The belt modules comprise a plurality of thin metal links attached to a crossbar at spaced locations. The metal links extend along lines oblique to the length of the crossbar from a first loop to a second loop. Belt rows include one or more of the belt modules sandwiched between tension links. Hinge rods connect adjacent belt rows together through aligned first and second loops and first and second rod holes in the tension links of adjacent belt rows to form the conveyor belt. The links can be formed of bent wire or stamped and bent sheet metal. Intermediate portions of the links can be planar or curved.

19 Claims, 8 Drawing Sheets

(58) Field of Classification Search
USPC ......................................................... 198/853
See application file for complete search history.

(56) References Cited

U.S. PATENT DOCUMENTS

| | | | | | |
|---|---|---|---|---|---|
| 4,676,368 | A | * | 6/1987 | Damkjar | B65G 17/08 |
| | | | | | 198/852 |
| 5,174,438 | A | | 12/1992 | Witham et al. | |
| 5,431,275 | A | * | 7/1995 | Faulkner | B65G 17/086 |
| | | | | | 198/852 |
| 5,613,597 | A | | 3/1997 | Palmaer et al. | |
| 5,829,578 | A | * | 11/1998 | Froderberg | B65G 17/064 |
| | | | | | 198/848 |
| 6,070,715 | A | | 6/2000 | Etherington et al. | |
| 6,089,379 | A | | 7/2000 | Stebnicki et al. | |
| 6,142,295 | A | | 11/2000 | Greve | |
| 7,624,858 | B2 | | 12/2009 | Delair et al. | |
| 8,167,751 | B2 | * | 5/2012 | Gramby | B65G 17/064 |
| | | | | | 198/848 |
| 2005/0183936 | A1 | * | 8/2005 | Neely | B65G 17/086 |
| | | | | | 198/852 |
| 2008/0271979 | A1 | | 11/2008 | Meulenkamp | |
| 2018/0162648 | A1 | * | 6/2018 | Maine, Jr. | B65G 17/064 |
| 2018/0346251 | A1 | * | 12/2018 | Riva, II | B65G 17/064 |
| 2019/0263593 | A1 | | 8/2019 | Maine, Jr. et al. | |
| 2020/0189850 | A1 | | 6/2020 | Messick, Jr. | |
| 2021/0179359 | A1 | | 6/2021 | Safvi et al. | |

FOREIGN PATENT DOCUMENTS

| | | | | | |
|---|---|---|---|---|---|
| EP | 0894743 | B1 | | 11/2000 | |
| GB | 853074 | A | * | 11/1960 | B65G 17/064 |
| WO | 1996020123 | A1 | | 7/1996 | |
| WO | 2004067459 | A1 | | 8/2004 | |

* cited by examiner

120

129    128

125    126    124

122

125

126    124

130

134

132

134

130

132

OBLIQUE-LINK MODULAR CONVEYOR BELT

BACKGROUND

The invention is related to power-driven conveyors and more particularly to conveyor belts having belt modules with oblique metal or wire links.

Conveyor belts constructed of thin wire links attached to a single crossbar are used to construct lightweight, easy-to-clean conveyor belts. One example of such a conveyor belt is described in U.S. Pat. No. 11,053,080, "EYELINK BELT DRIVE SYSTEMS AND METHODS," to George H. Messick, Jr. The wire links in that belt are perpendicular to the crossbar to which they are attached. So when joined by hinge pins to form a conveyor belt, adjacent modules have to be laterally offset from each other for the hinge eyes of adjacent modules to interleave.

SUMMARY

One version of a conveyor belt module embodying features of the invention comprises metal or wire links extending in length from a first end to an opposite second end and forming a first loop at the first end and a second loop at the second end and a metal crossbar having a length extending in a width direction of the conveyor belt module. The metal or wire links are attached at spaced apart positions along the length of the crossbar along lines oblique to the length of the crossbar.

Another version of a conveyor belt module comprises a crossbar having a length extending in a width direction of the conveyor belt module and having a first side and an opposite second, first metal links extending in length from the first side of the crossbar to a first end, and second metal links extending in length from the second side of the crossbar to a second end. The first metal links each have a loop at the first end, and the second metal links each have a loop at the second end. The crossbar and the first and second metal links are unitarily formed by stamping or laser-cutting a sheet-metal plate or by metal injection-molding or metal investment-casting and then bending the first and second metal links to form the loops at the first and second ends. A line perpendicular to the crossbar and through the first end of any of the first links does not intersect any of the second links.

One version of a conveyor belt embodying features of the invention comprises a plurality of belt rows that extend in width from a first side to a second side. Each belt row includes one or more belt modules having metal or wire links attached to a crossbar along the crossbar's length. The metal or wire links extend along lines oblique to the crossbar's length from a first loop to a second loop. Tension links at the first and second sides have first rod holes aligned with the first loops and second rod holes aligned with the second loops. The first rod holes and the first loops of a belt row are aligned with the second rod holes and the second loops of an adjacent belt row to form a lateral passageway extending across the width of the belt rows. Hinge rods received in the lateral passageways join the belt rows together at hinge joints between adjacent rows to form a conveyor belt.

DETAILED DESCRIPTION

Figure 1:
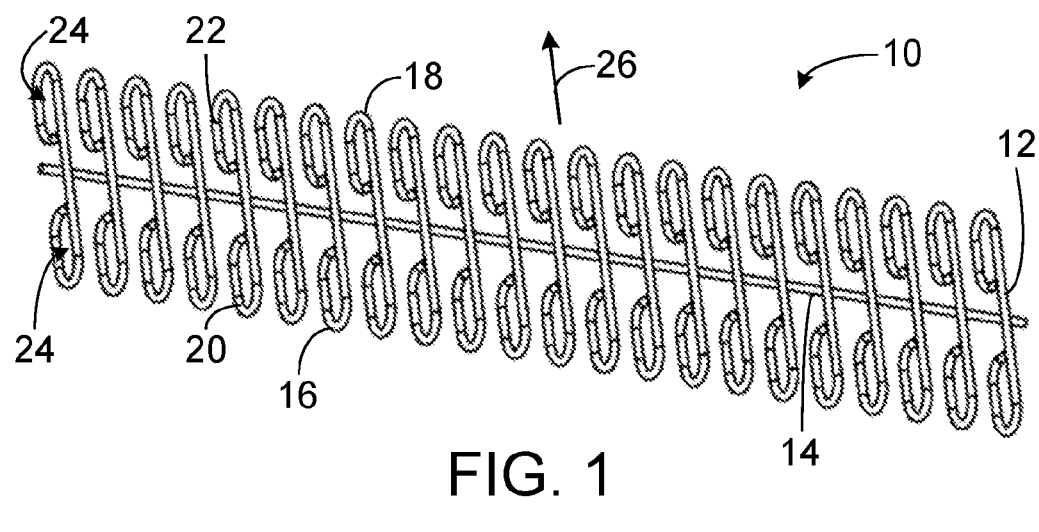
FIG. 1 is a perspective view of one version of a conveyor belt module embodying features of the invention.
Figure 2:
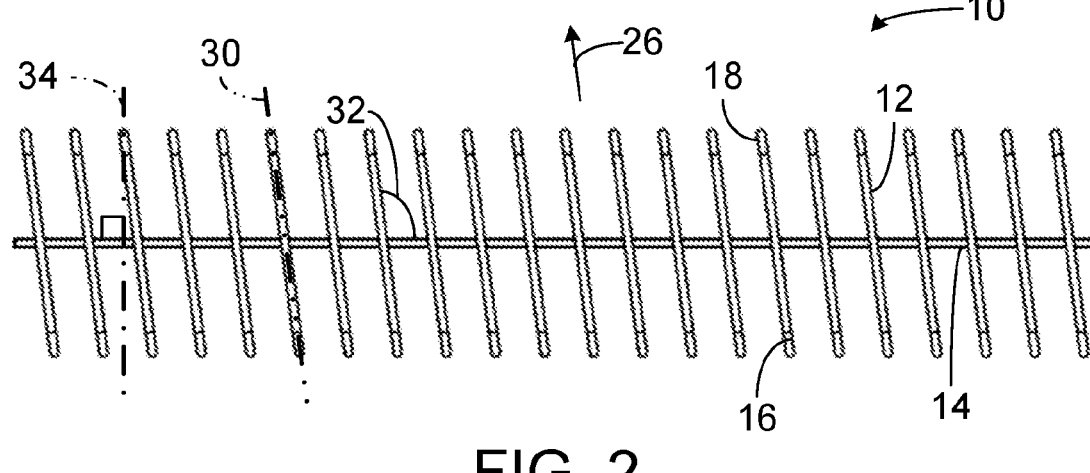
FIG. 2 is a top plan view of the conveyor belt module of FIG. 1.
Figure 3:
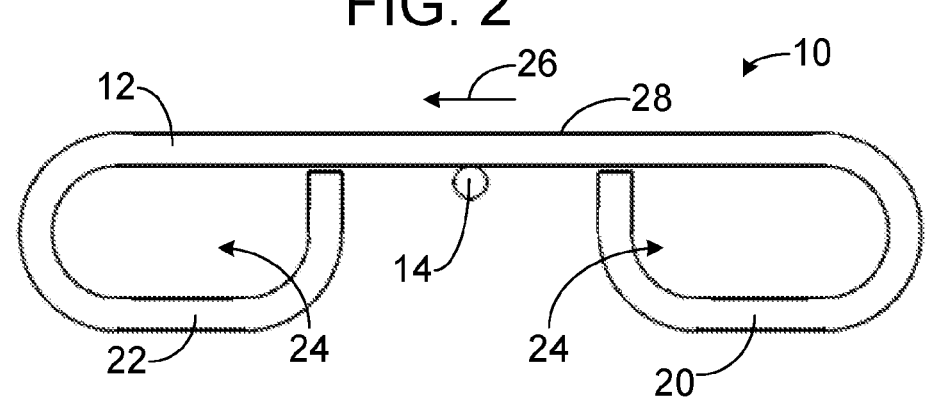
FIG. 3 is an enlarged side elevation view of the conveyor belt module of FIG. 1.

FIGS. 1-3 are various views of a conveyor belt module embodying features of the invention. The conveyor belt module 10 is constructed of a plurality of individual wire belt links 12 attached at spaced apart positions on a crossbar 14. The wire links 12 extend in length from first ends 16 to opposite second ends 18. The cross section of each link is constant along its length. First hinge loops 20 are formed at the first ends 16 of the wire links 12. Second hinge loops 22 are formed at the second ends 18 of the wire links 12. The loops 20, 22 are formed by bends in the ends 16, 18 of the wire links 12. The loops 20, 22 circumscribe hinge eyes 24. In this example the loops 20, 22 are elongated in a direction of belt travel 26. But the loops at one end or the other, or both, could be shaped otherwise, such as circular. The wire links 12 are attached to the top of the crossbar 14 to provide the module 10 with top surface elements 28 lying in a common plane defining a flat conveying surface. But the links could be attached to the underside of the crossbar instead. The metal links 12 can be attached to the metal crossbar 14 by welding, gluing, or some other bonding technique. Wire links having a similar geometry could alternatively be made of a plastic or a thermoset material.

As FIG. 2 shows, the wire links 12 extend in length from their first ends 16 to their second ends 18 along lines 30 parallel to each other and oblique to the length of the crossbar 14 on an oblique angle 32. The first hinge loops 20 and the second hinge loops 22 are on opposite sides of the crossbar 14. And the crossbar 14 attaches to the wire links 12 midway between the first and second loops 20, 22, but could be attached closer to one of the ends than to the other. Although the wire links 12 are shown equi-spaced in this example, they could be positioned on the crossbar 14 with different spacings. Furthermore, the wire links 12 could be arranged on differing oblique angles. A line 34 perpendicular to the length of the crossbar 14 and through either of the ends 16, 18 of any wire link 12 does not intersect any other wire link.

As shown in FIG. 3, the cross sections of the crossbar 14 and the wire links 12 are circular in this example, and the cross-sectional area of the crossbar 14 is the same as that of the links 12. But the cross sections could define different shapes. And the cross sections could vary along the lengths of the links or from link to link. The wire links 12 are thin: the spaces between adjacent link loops 20, 22 are three to four times the width of the links in this version.

Figures 4, 5:
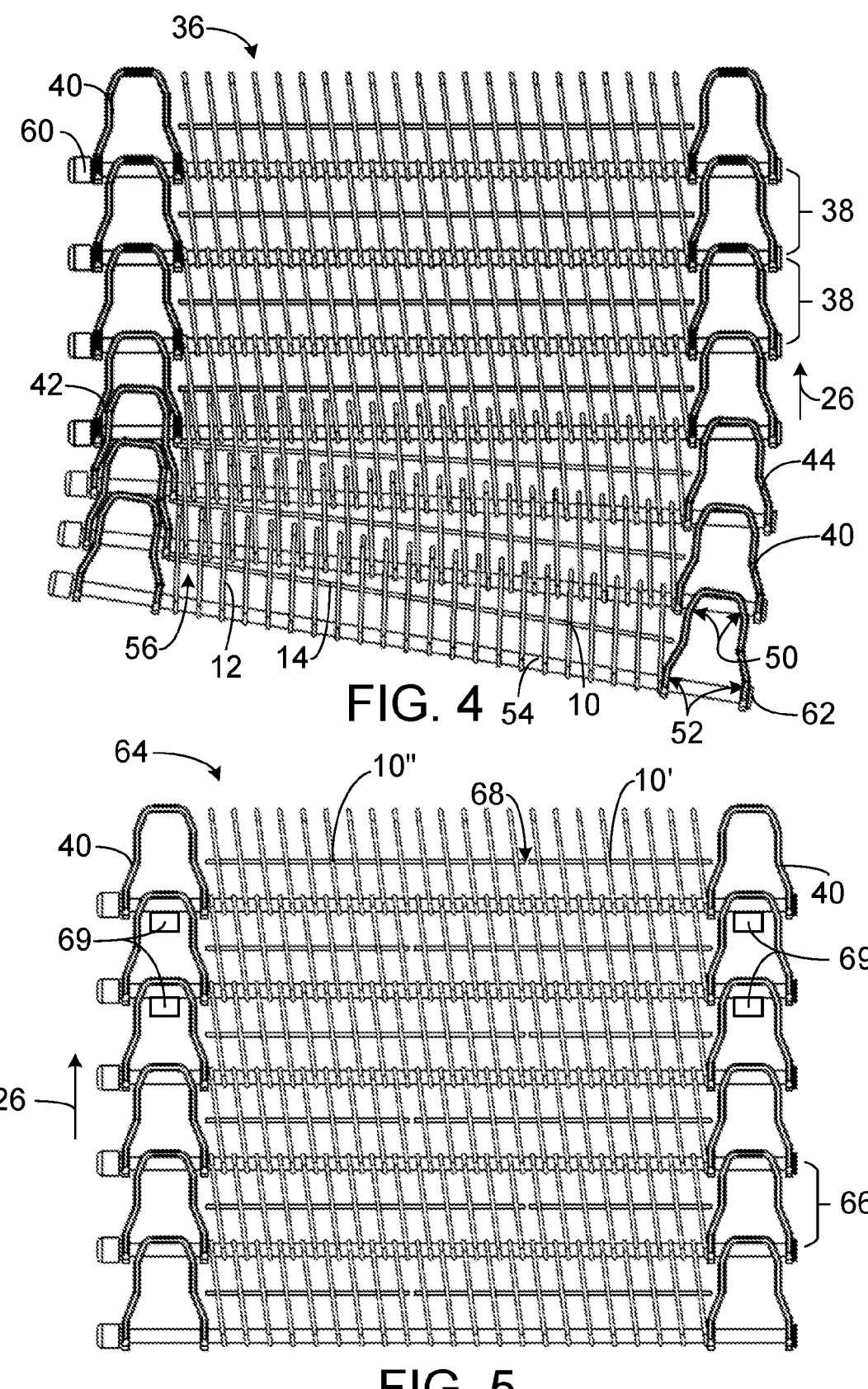
FIG. 4 is a top plan view of a portion of a conveyor belt constructed of the conveyor belt modules of FIG. 1.
FIG. 5 is a top plan view of a portion of a conveyor belt constructed of conveyor belt modules as in FIG. 1 in a bricklay pattern.

A portion of a conveyor belt 36 constructed of a series of belt rows 38 is shown in FIG. 4. Each belt row 38 includes a conveyor belt module 10 as in FIG. 1 sandwiched between U-shaped tension links 40 at outer first and second sides 42, 44 of each belt row. Linear tension links can alternatively be used. The tension links 40 bear the bulk of the belt tension while the belt is driven in the direction of belt travel 26. The tension links 40 at the outside of a turn bear almost all the tension. On straight runs the bulk of the belt tension is shared by the tension links 40 on both sides 42, 44. Because the tension links 40 bear most of the tension, the wire links 12 and the crossbars 14 can be made relatively thin to make for a lightweight belt with plenty of open area for airflow or drainage, for example.

The U-shaped tension links 40 have two pairs of rod holes: first rod holes 50 near the base of the links' U-shape and second rod holes 52 at ends of the arms of the U-shape. In this example, the first rod holes 50 are elongated and the second rod holes 52 are circular or elongated a lesser distance than the first rod holes. (new) The first rod holes 50 and the first hinge loops 20 of the wire links of each belt row 38 are aligned with the second rod holes 52 and the second hinge loops 22 of an adjacent row to form a lateral passageway across the width of the conveyor belt 36. Hinge rods 54 received in the passageway between each row 38 connect adjacent rows together to form the conveyor belt 36. Because the wire links 12 are obliquely oriented relative to the crossbars 14, the belt modules 10 don't have to be laterally offset from row to row to be connected. In conveyor belts whose links are perpendicular to the crossbars, belt modules in adjacent rows have to be laterally offset for the wire links to interleave at the hinges. Furthermore, because the narrow wire links 12 are much narrower than the spaces 56 between consecutive links, the belt 36 collapses at the inside of tight turns as shown in FIG. 4.

Optional protrusions 60 extend laterally outward of the first side 42 of the conveyor belt 36. The protrusions 60 can serve as driven elements in a spiral conveyor or other edge-driven system. As shown, the protrusions 60 are extensions of the hinge rods 54 in each belt row 38. But they could be formed as projections from the tension links 40 instead. And they do not have to be formed on each row. They could also be formed on the second side 44 of the belt 36. If they are not needed, both sides of the belt 36 would include a standard rod head 62 as shown at the second side 44 in FIG. 4.

The conveyor belt 64 in FIG. 5 differs from the conveyor belt 36 of FIG. 4 in that each belt row 66 comprises two belt modules: a short belt module 10' and a longer belt module 10" side by side with an intervening seam 68. The seams 68 of adjacent belt rows 66 are laterally offset when the belt modules 10', 10" are arranged in a bricklay pattern. Although FIG. 5 shows only two modules 10', 10" per row 38, more could be used to form a wider belt.

FIG. 5 also shows how the conveyor belt 64 or the conveyor belt 36 of FIG. 4 can be driven by sprockets. Sprocket teeth 69 at each side of the conveyor belt drive against the steel hinge rods 54 in the interior of the U-shaped tension links 40 to push the conveyor belt 64 in the direction of belt travel 26.

Figure 6:
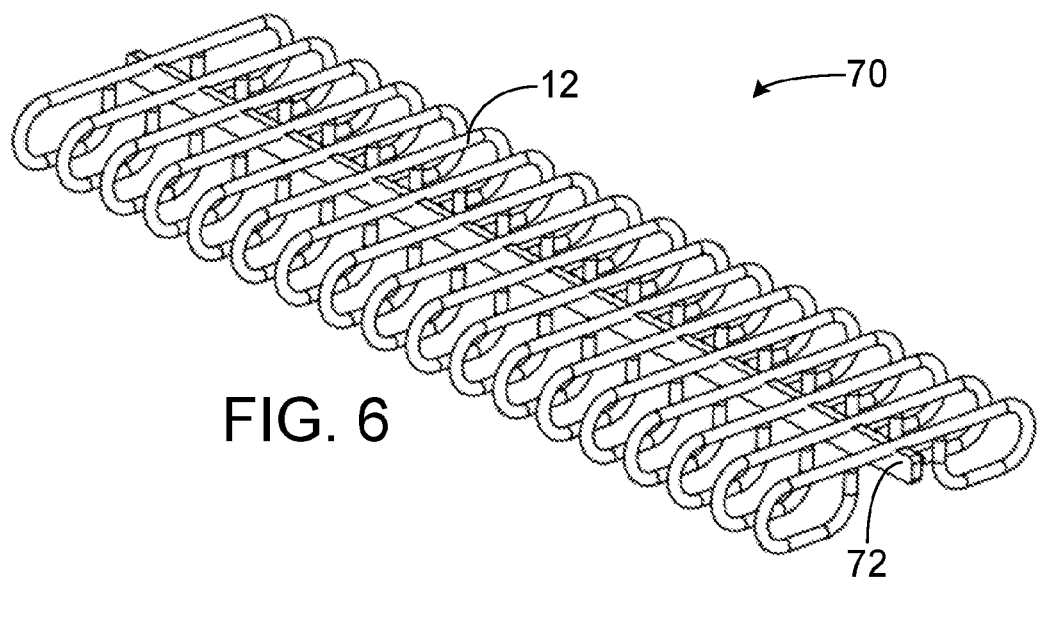
FIG. 6 is an isometric view of another version of a conveyor belt module embodying features of the invention including a thicker crossbar than the crossbar in the module of FIG. 1.

Another version of a conveyor belt module usable in conveyor belts as in FIGS. 4 and 5 is shown in FIG. 6. The belt module 70 differs from the belt module 10 of FIG. 1 only in that the crossbar 72 is heftier than the circular crossbar. The cross-sectional area of the rectangular crossbar 72 is greater than the cross-sectional area of the wire links 12. The increased thickness of the crossbar 72 in the vertical direction adds beam stiffness to the belt module 70 to support heavy product loads and to enable the use of wider modules.

Figure 7:
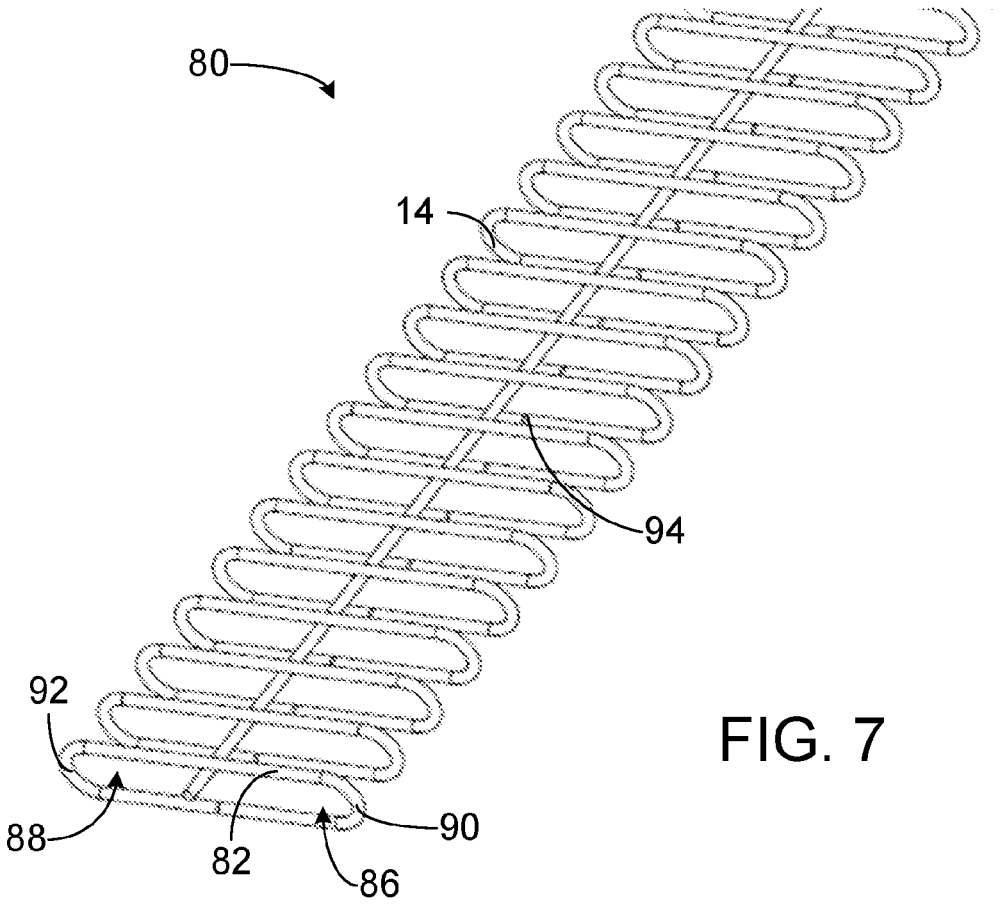
FIG. 7 is an isometric view of yet another version of a wire-link conveyor belt module.

Yet another version of a conveyor belt module usable in conveyor belts as in FIGS. 4 and 5 is shown in FIG. 7. The belt module 80 has wire links 82 in the form of ovals made of wires formed into the oval shape with ends welded or otherwise bonded together at junctures 94 on a bottom leg. Top legs 84 of the links 82 are attached to the crossbar 14. The heftier crossbar 72 of FIG. 6 could alternatively be used. The oval links form elongated open hinge loops 86, 88 defining hinge eyes at each end 90, 92 rather than the generally closed loops formed at the ends of the wire links in FIGS. 1 and 6.

Figure 8:
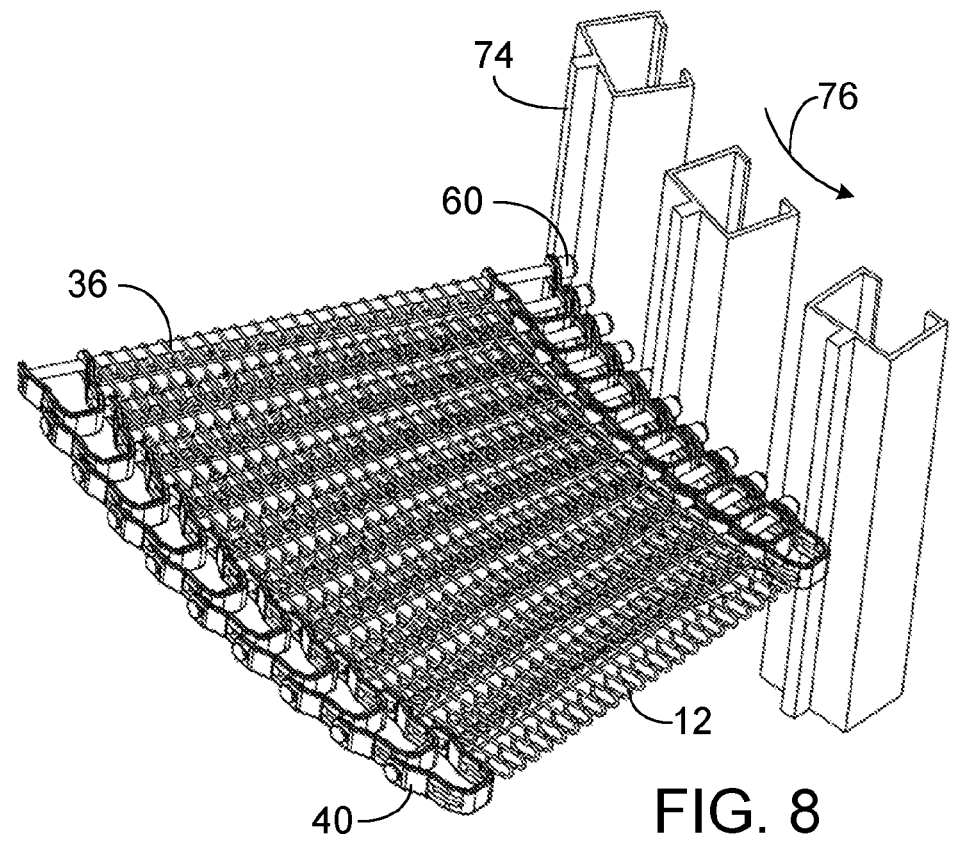
FIG. 8 is a perspective view of a modular conveyor belt as in FIG. 4 driven positively at its inside edge.

The conveyor belt 36 of FIG. 4 is shown in a spiral conveyor system in FIG. 8. The protrusions 60 at the inner side of the belt 36 are positively engaged by vertical ribs 74 on drive members circumferentially spaced around a conventional cylindrical drive drum (not shown). The ribs 74 engage the protrusions 60 to positively drive the belt 36 in the drive direction 76 without slip. The thin wire links 12 and the nesting U-shaped tension links enable the side of the conveyor belt 36 at the inside of the turn to collapse. The uncollapsed outside tension links 40 bear the majority of the belt tension.

Figure 9:
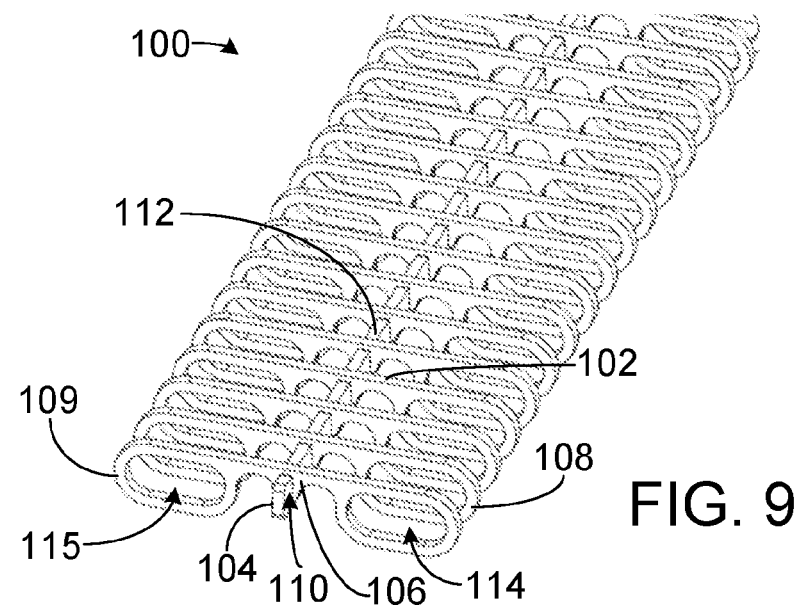
FIG. 9 is a perspective view of a portion of another version of a conveyor belt module made of stamped, laser-cut, or metal injection-molded links bonded to a crossbar.

Another version of a conveyor belt module similar to the module of FIG. 6 is shown in FIG. 9. The conveyor belt module 100 is made of metal links 102 welded to a rectangular crossbar 104. Each link 102 is stamped or laser-cut from a flat sheet metal plate. Each metal link 102 has an intermediate portion 106 between loops 108, 109 at opposite ends. The intermediate portion 106 has a slot 110 that mates transversely with a slot 112 in the crossbar 104. The links 102 are welded or otherwise bonded to the crossbar 104 at the crossbar's slots 112 spaced apart along the length of the crossbar. The loops 108, 109 completely enclose hinge eyes 114, 115. Like the links of the conveyor belt modules of FIGS. 1-9, the links 102 are arranged in parallel along lines oblique to the length of the crossbar 104. Alternatively, each link can be made by metal injection-molding or metal investment casting.

Figure 10:
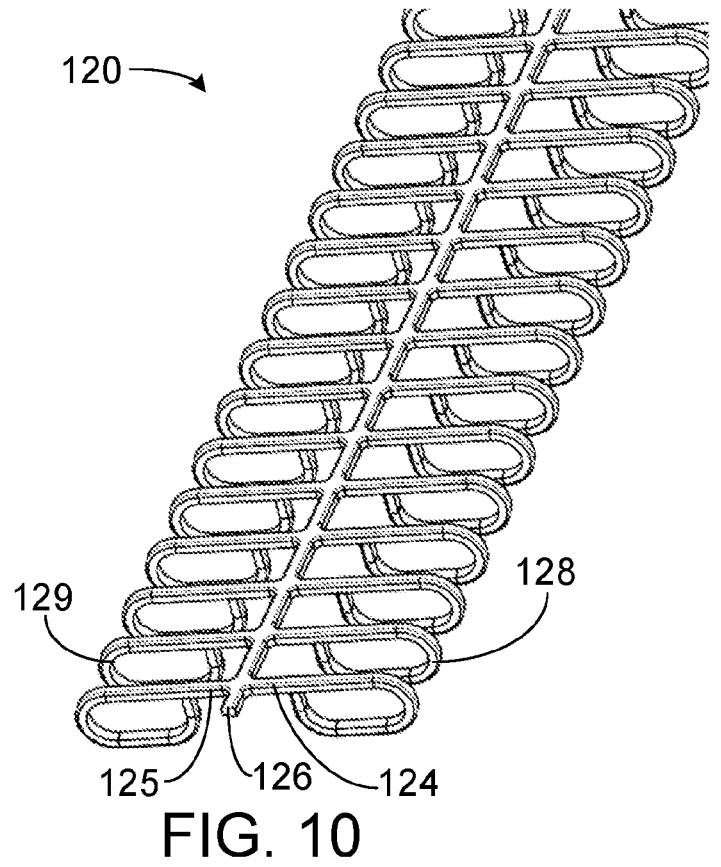
FIG. 10 is a perspective view of a portion of another version of a conveyor belt module made of a stamped-out or laser-cut metal sheet or made by metal injection-molding or metal investment-casting and then bent to form hinge loops.
Figure 11:
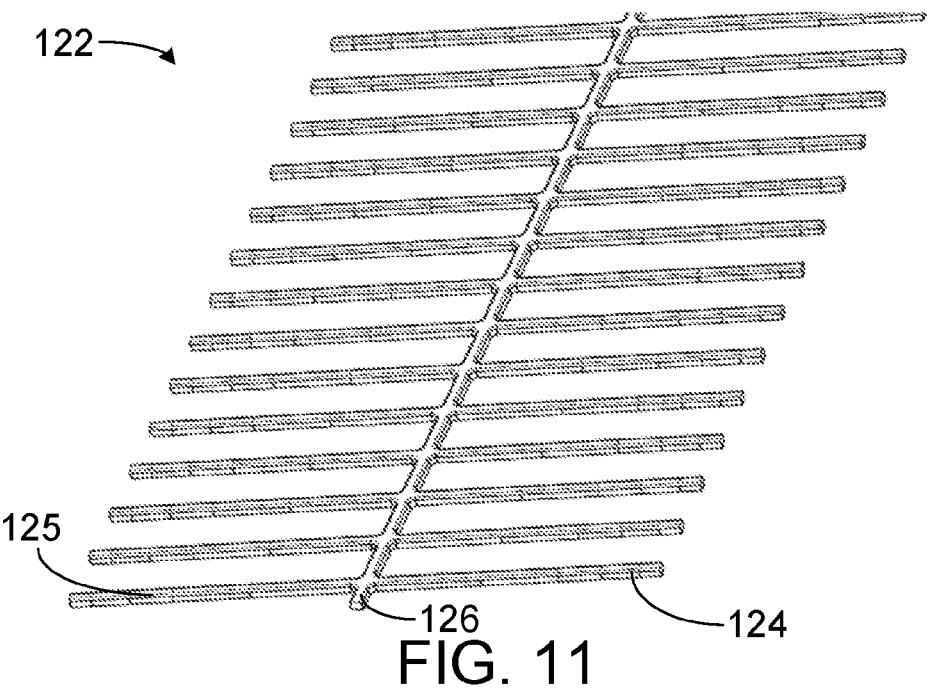
FIG. 11 is a perspective view of the portion of the conveyor belt module of FIG. 10 before bending.

Yet another version of a conveyor belt module is shown in FIG. 10. The conveyor belt module 120 is similar to the belt module of FIG. 1. It is formed from a sheet metal plate. The sheet metal is first stamped or laser-cut to produce a two-dimensional skeleton 122 as in FIG. 11. Alternatively, the two-dimensional skeleton 122 can be formed by metal injection-molding or metal investment-casting. The two-dimensional skeleton 122 has first and second aligned link portions 124, 125 extending from opposite sides of a unitarily formed crossbar 126 in a common plane. The ends of the link portions 124, 125 are then bent to form first and second loops 128, 129.

Figure 12:
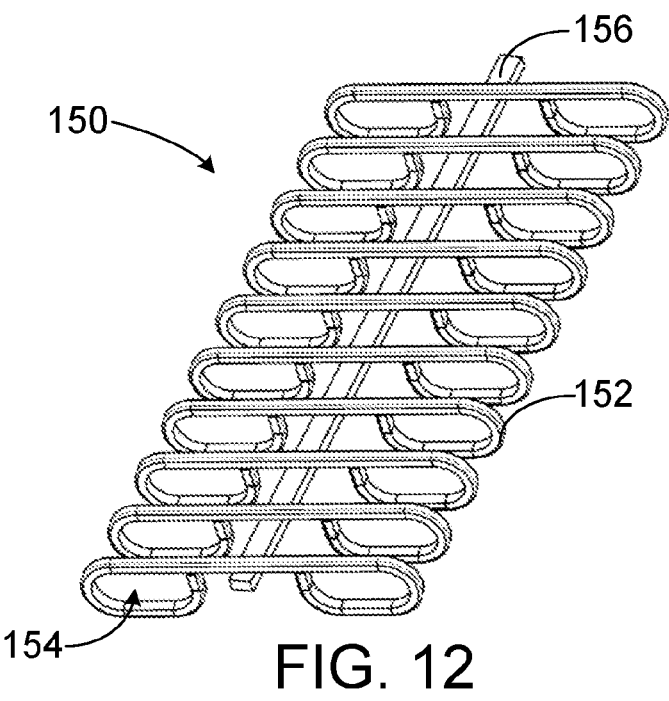
FIG. 12 is a perspective view of a conveyor belt module having stamped, laser-cut, metal investment-cast, or metal injection-molded links bent to form hinge loops and bonded to a crossbar.

The conveyor belt module 150 of FIG. 12 is made of links 152 stamped or laser-cut from a sheet-metal plate or metal injection-molded or metal investment-cast and then bent to form hinge loops 154. The individual links are welded or otherwise bonded obliquely to a crossbar 156. By not forming the crossbar with the links, much less sheet-metal material is wasted. Alternatively, the links could be metal injection-molded or metal investment-cast with pre-formed hinge loops.

Figure 13:
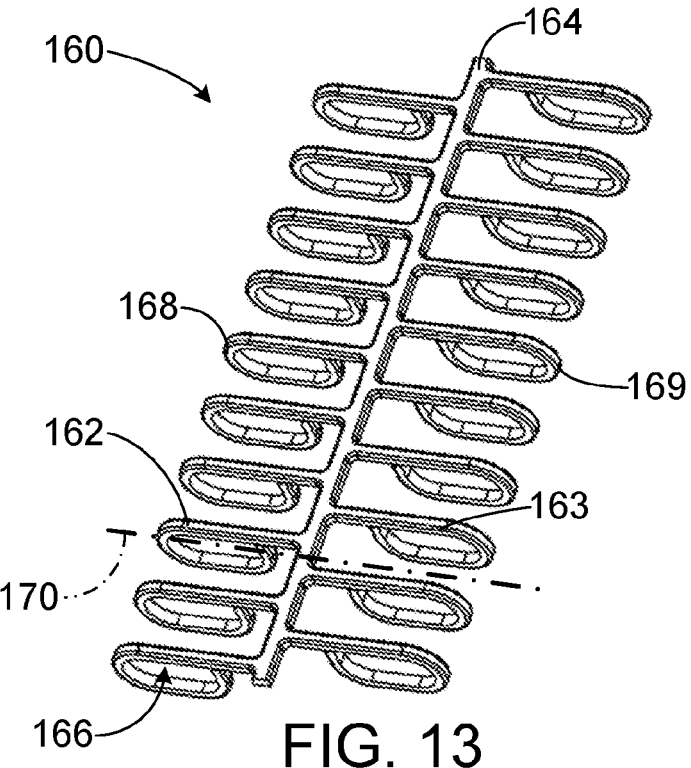
FIG. 13 is a perspective view of an offset-link version of the conveyor belt module of FIG. 10.

FIG. 13 depicts a conveyor belt module 160 that is made in the same way as the conveyor belt module 120 of FIG. 10, except that it has first links 162 extending in one direction from a unitarily formed crossbar 164 and second links 163 laterally offset from the first links and extending in an opposite direction from the crossbar. The first and second links have hinge loops 166 that extend to first and second ends 168, 169. The first and second links 162, 163 may be perpendicular to the length of the crossbar 164. A line 170 drawn parallel to and through any of the first links 162 and perpendicular to the length of the crossbar 164 does not intersect any of the second links 163.

Figure 14:
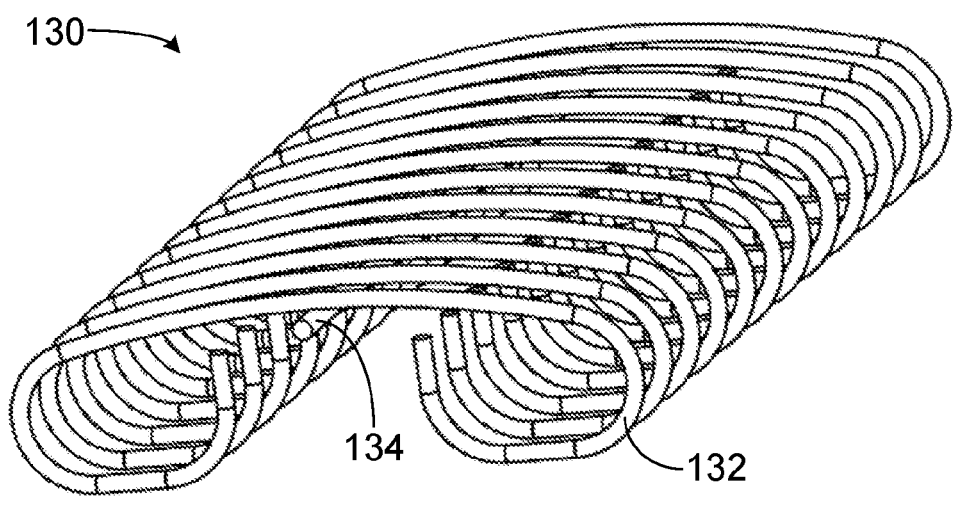
FIG. 14 is a perspective view of a curve-top version of the conveyor belt module of FIGS. 1 and 2.
Figure 15:
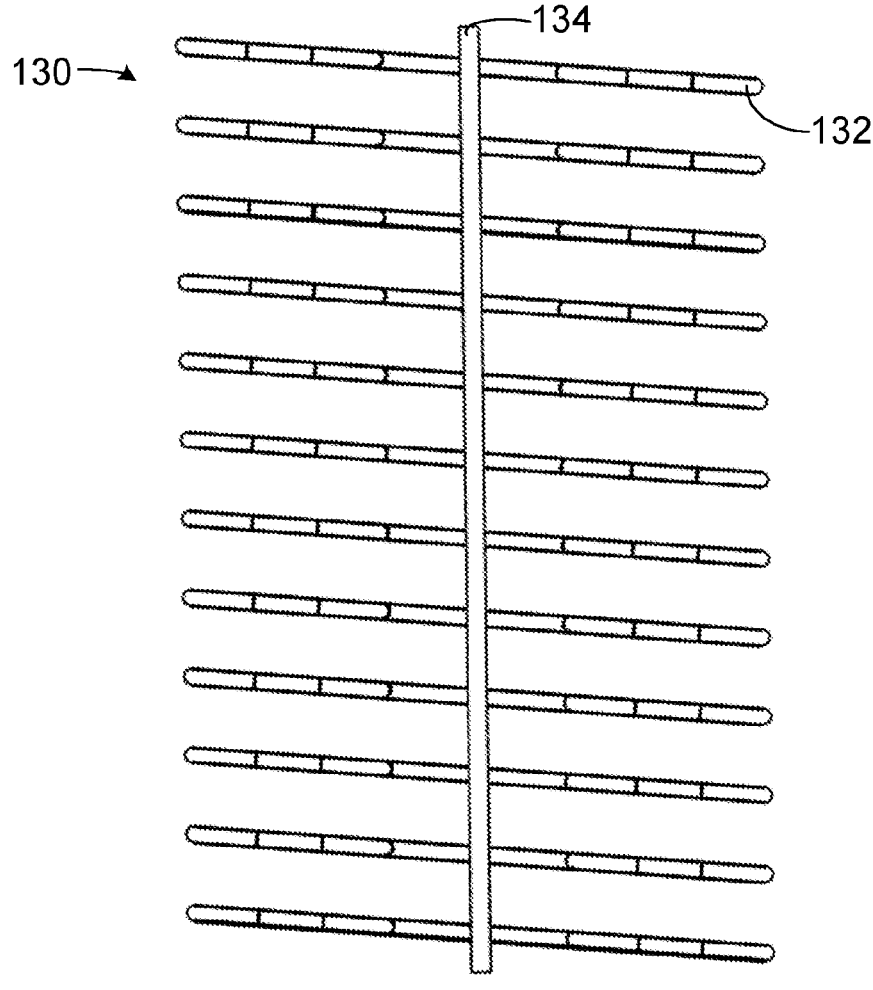
FIG. 15 is a bottom plan view of the conveyor belt module of FIG. 14.

A curve-top conveyor belt module 130 is shown in FIGS. 14 and 15. The module 130 is similar to the module 10 of FIGS. 1 and 2, except that its wire links 132 form a convexly curved article-conveying surface at the top rather than a flat conveying surface. The links 132 are welded to a crossbar 134 at spaced apart locations along the crossbar's length. And, as in the modules of FIGS. 1 and 2, the links 132 are oblique to the crossbar 134.

Figure 16:
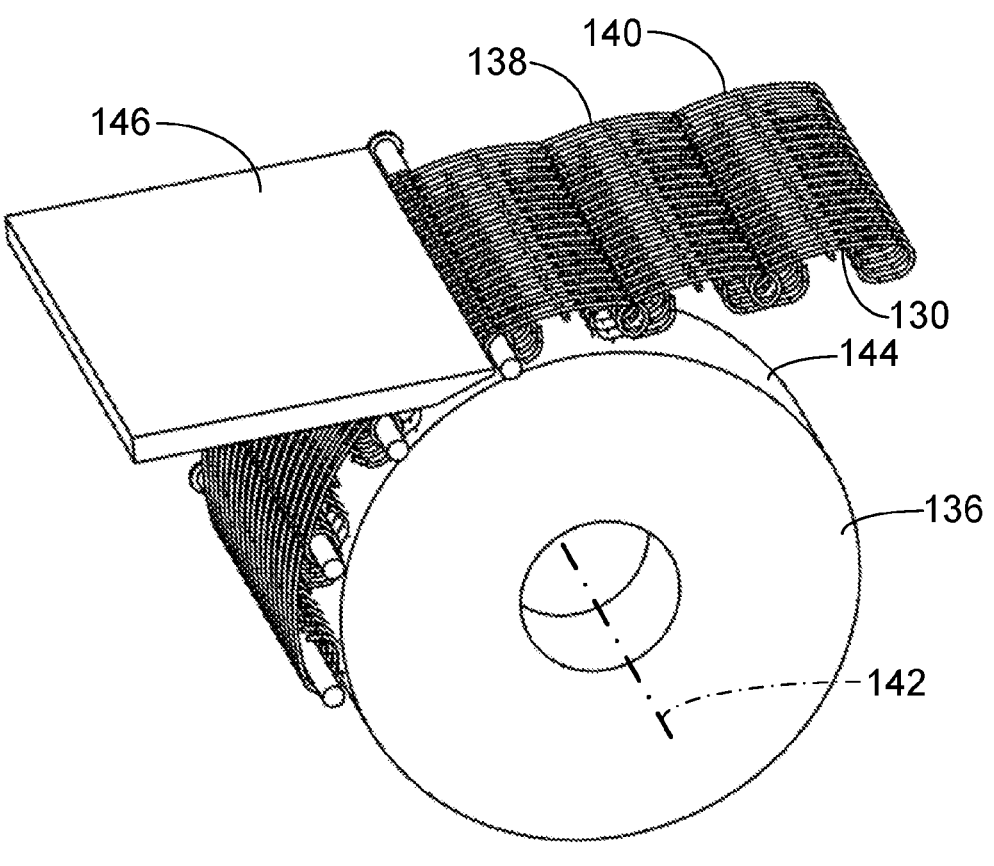
FIG. 16 is an isometric view of a portion of a conveyor belt constructed of belt modules as in FIG. 14 negotiating a sprocket and cooperating with a transfer plate.
Figure 17:
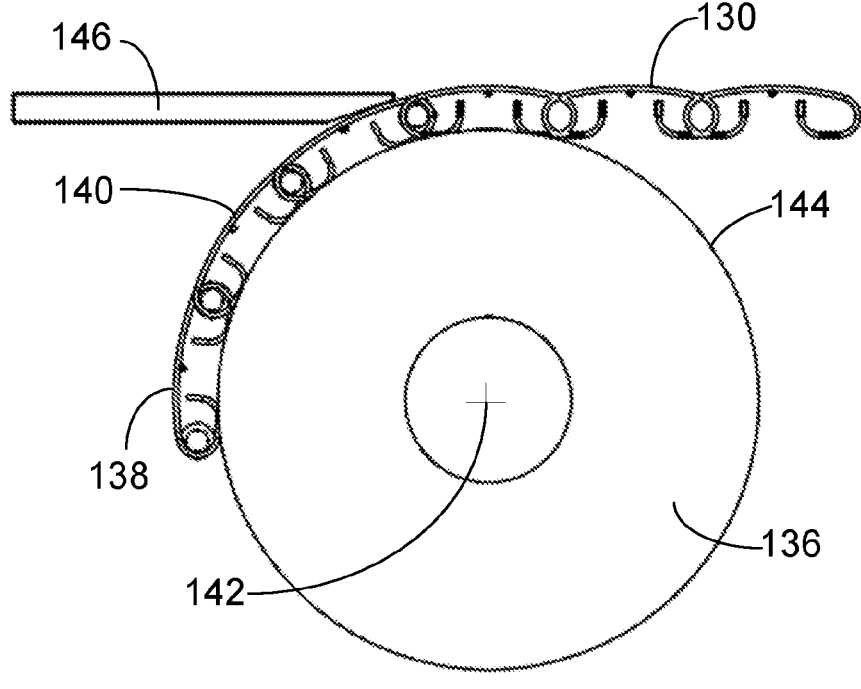
FIG. 17 is a side elevation view of the conveyor belt of FIG. 16.

A portion of a conveyor belt constructed of belt modules 130 as in FIGS. 14 and 15 is shown in FIGS. 16 and 17 rounding a reversing element 136, such as a sprocket, roller, nosebar, or nose roller, around which the conveyor belt reverses direction or begins its direction reversal as it moves from an upper carryway to a lower returnway and back again. The curvature of the top conveying surface 120 of the modules 130 is selected to be slightly less than the curvature of the periphery 144 of the reversing element 136 around which the conveyor belt 138 is wrapped. The difference in curvatures is necessary because the top conveying surface 140 of the belt modules 130 is farther from the center of curvature 142 (the axis of the reversing element 136) than is the periphery 144 of the reversing element. When properly chosen, the top conveying surface 140 forms a smooth circular arc about the reversing element 136 that allows a transfer plate 146 to be positioned close to the conveyor belt 138 at its entry onto the reversing element to strip conveyed products from the belt.

All the conveyor belt modules described can be used to construct conveyor belts with tension links 40 as in FIG. 4 or FIG. 5. And any of the links shown can be bent or formed to construct a curve-top conveyor belt module.

What is claimed is:

1. A conveyor belt module comprising:
a plurality of metal links spaced apart in a width direction of the conveyor belt module and extending in length from a first end to an opposite second end and forming a first loop at the first end and a second loop at the second end;
a crossbar having a length extending in the width direction of the conveyor belt module;
wherein the plurality of metal links are attached at spaced apart positions along the length of the crossbar on lines oblique to the length of the crossbar.

2. The conveyor belt module as claimed in claim 1 wherein the lines oblique to the length of the crossbar are parallel and/or equi-spaced.

3. The conveyor belt module as claimed in claim 1 wherein the metal links are circular in cross section and the crossbar is circular or rectangular in cross section.

4. The conveyor belt module as claimed in claim 1 wherein the cross section of the crossbar is greater than or equal to the cross section of the links.

5. The conveyor belt module as claimed in claim 1 wherein the metal links are welded to the top of the crossbar.

6. The conveyor belt module as claimed in claim 1 wherein a line extending perpendicular to the length of the crossbar and through the first loops or the second loops of any of the metal links does not intersect another one of the metal links.

7. The conveyor belt module as claimed in claim 1 wherein the metal links form an oval.

8. The conveyor belt module as claimed in claim 1 wherein each of the metal links is formed by stamping a sheet metal plate and welding the metal links to the crossbar.

9. The conveyor belt module as claimed in claim 1 formed by:
stamping a sheet metal plate to form a two-dimensional skeleton having link portions extending in a common plane from opposite sides of the crossbar; and
bending the ends of the link portions to form the first and second loops.

10. The conveyor belt module as claimed in claim 1 wherein the metal links define a convexly curved article-conveying surface.

11. A conveyor belt comprising:
a plurality of belt rows extending in width from a first side to a second side, each belt row including:
one or more belt modules having a plurality of metal or wire links attached to a crossbar along the crossbar's length and extending on lines oblique to the crossbar's length from a first loop to a second loop, wherein the crossbar's length extends from the first side to the second side of the belt row;
tension links at the first and second sides and having first rod holes aligned with the first loops and second rod holes aligned with the second loops;
wherein the first rod holes and the first loops of a belt row are aligned with the second rod holes and the second loops of an adjacent belt row to form a lateral passageway extending across the width of the belt rows;
a plurality of hinge rods, each received in the lateral passageways to join the belt rows together at hinge joints between adjacent rows to form a conveyor belt.

12. The conveyor belt as claimed in claim 11 wherein the tension links are U-shaped.

13. The conveyor belt as claimed in claim 11 comprising protrusions extending laterally outward of the first sides of individual belt rows.

14. The conveyor belt as claimed in claim 13 wherein the protrusions are formed by the ends of individual hinge rods at the first sides.

15. The conveyor belt as claimed in claim 11 wherein the second loops and the second rod holes are elongated in a direction of belt travel.

16. The conveyor belt as claimed in claim 11 wherein the lines oblique to the crossbar's length are parallel and equispaced.

17. The conveyor belt as claimed in claim 11 wherein the metal or wire links and the crossbar have the same cross-sectional area.

18. A conveyor belt module comprising:

a crossbar having a length extending in a width direction of the conveyor belt module and having a first side and an opposite second;

a plurality of first metal links extending in length from the first side of the crossbar to a first end;

a plurality of second metal links extending in length from the second side of the crossbar to a second end;

wherein the first metal links each have a loop at the first end and the second metal links each have a loop at the second end;

wherein the crossbar and the first and second metal links are unitarily formed by stamping or laser-cutting a sheet-metal plate or by metal injection-molding or metal investment-casting and then bending the first and second metal links to form the loops at the first and second ends;

wherein a line perpendicular to the crossbar and through the first end of any of the first links does not intersect any of the second links;

wherein each of the first links is aligned with a corresponding one of the second links along a line oblique to the length of the crossbar.

19. The conveyor belt module as claimed in claim 18 wherein the first links are offset from the second links in the width direction along the length of the crossbar.

\* \* \* \* \*